T. F. STRAUB.
Vent-Cock for Beer Fermenting Casks.
No. 208,771.　　　　　　　Patented Oct. 8, 1878.
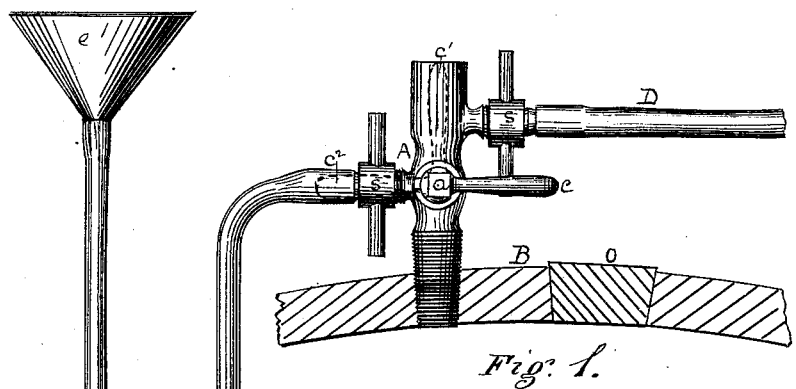
Fig. 1.
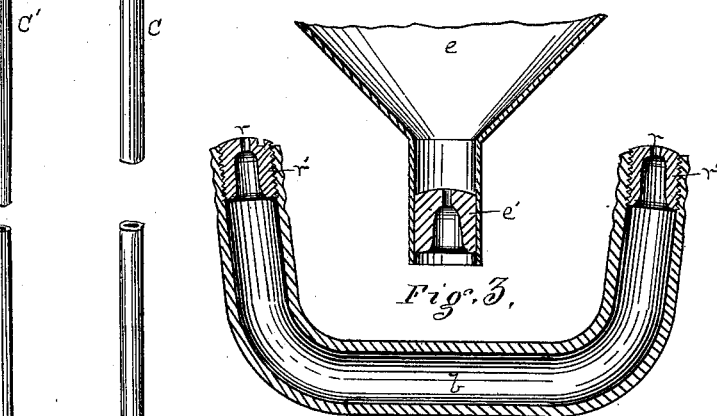
Fig. 3.
Fig. 2.
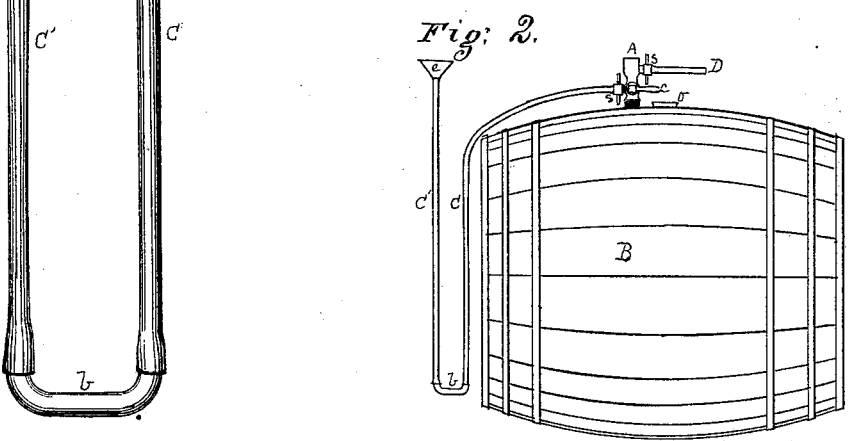
Fig. 4.
Witnesses
Inventor Theodore F. Straub,
By Attorney George H. Christy

UNITED STATES PATENT OFFICE.

THEODORE F. STRAUB, OF ALLEGHENY CITY, PENNSYLVANIA.

IMPROVEMENT IN VENT-COCKS FOR BEER-FERMENTING CASKS.

Specification forming part of Letters Patent No. 208,771, dated October 8, 1878; application filed September 6, 1878.

*To all whom it may concern:*

Be it known that I, THEODORE F. STRAUB, of Allegheny city, county of Allegheny, State of Pennsylvania, have invented or discovered a new and useful Improvement in Cock and Vent for Beer-Casks; and I do hereby declare the following to be a full, clear, concise, and exact description thereof, reference being had to the accompanying drawing, making a part of this specification, in which—like letters indicating like parts—

Figure 1 shows, in elevation, my improved cock and vent for beer-casks. Fig. 2 is an enlarged vertical sectional view of the lower part of the U-shaped pipe or tube used in the apparatus. Fig. 3 is a like view of the funnel used at the outer end of the tube; and Fig. 4 is a reduced view, in elevation, of my improved apparatus as applied to a finishing-cask.

My invention relates to a device adapted for use in the manufacture of lager-beer and other malt or fermented liquors; and the purpose of its use is to secure a constant and uniform pressure on the liquor being treated, whereby the gas generated during such treatment is allowed to escape, while the liquor itself is retained in the cask. Other useful results are also secured by its use, as will presently appear.

In the "finishing process," so called, of the manufacture of lager-beer, the liquor is drawn from the "stocking-cask" into what is known as a "finishing-cask," and then charged with, say, from eight to ten per centum, by quantity, of freshly-fermented liquor. This charge causes a refermentation, or an additional fermentation or working, in the contents of the cask, and it has been the custom to open the bung of the cask while this fermentation was going on, and allow the gas generated to escape through it; but in so escaping the gas carries with it considerable liquor, which is wholly wasted, and hence it is necessary to add, from time to time, charges of fermented liquor to supply such waste and keep the cask well filled. When this action or fermentation has continued a proper time, the cask is closed and allowed to stand for a time, and when the liquor has attained a certain stage or condition it must be racked off at once, since if it remain a longer time it becomes muddy or deteriorated in quality. Such method of treatment requires close attention, not only to determine when this finishing operation should be arrested, but also to keep the cask properly filled as the waste is carried off.

My improvement is designed to obviate the necessity of watching this operation so closely, as with it there is no wastage of liquor, and therefore no occasion for refilling; and there is little or no danger of the beer becoming injured or deteriorated in case it is not drawn or racked off at once upon attaining a certain stage or condition.

My improved apparatus is constructed as follows: A three-way cock, A, is provided, having any suitable means, as a threaded end, as shown in Fig. 1, for attaching it to the cask B. One passage or way in this cock is arranged to open into the cask B, one to a pipe, D, and one to a U-shaped pipe or tube, C C'. These three ways are controlled by a rotating valve or plug, $a$, whereby the way leading into the cask may be opened to either the pipe D or the pipe C, or closed from both, at pleasure—as, for example, when the lever $c$, which operates the plug $a$, is in the position shown in full lines, Fig. 1, the way leading into the cask will be opened to the way leading to the pipe C, and closed as to that leading to the pipe D. When the valve is moved so that this lever occupies the position shown in dotted lines at $c^1$, communication will be opened from the cask through D and closed through C, and if for any cause it is desired to close the way to the cask from both D and C, it may be done by turning the plug $a$ until the lever occupies the position shown in dotted lines at $c^2$.

The pipes or tubes D and C C' may be made of any suitable material. I prefer, however, to use flexible hose, and they are connected to the cock A, so as to open into or communicate with their respective ways by screw-couplings $s\ s$, or other suitable coupling devices, properly packed to secure a tight connection.

The pipe C C' is made some ten or twelve feet in length, more or less, varying somewhat according to the degree of pressure required; and it is supported by any suitable means, so as to assume a U form, as shown, the leg or part C' being, by preference, about five feet in height, more or less.

In use, this pipe C C' is charged with water until such water reaches to or nearly to the level of the upper surface of the liquor in the cask; or, in any case, sufficient water is used to fill the part C' of the pipe. In order to facilitate this filling of the pipe, I attach a funnel, e, to its outer end; also, the flaring mouth of such funnel facilitates the escape of gas from the pipe, as presently described.

At the lower part of the U formed by the pipe C C', I make a short section, b, by preference of metal. The length of this section b is not material. I prefer, however, to let it include both elbows or curves of the U, so that the flexible tubes may hang nearly straight. At one or both ends of the section or part b I contract the passage to one or more small openings, r. This may be done by means of screw-plugs r', fitted in the ends of the section, as shown, or in other convenient way.

The object in thus reducing the passage in the pipe is to arrest the unequal or explosive action of the gas as it escapes from the cask B, and prevent it from forcing the water from the part C' by such sudden or irregular action. By thus reducing the passage at one or more points, the gas will find its way through such openings in small quantities or volumes only, which will bubble up through the water in the part C', and escape at the funnel-mouth e without agitating the water so as to force it from the pipe. For a like reason, I also prefer to make a similar contraction at or near the lower point of the funnel e. This may be done, as shown in Fig. 3, where the desired contraction is made by means of a perforated plug, e', secured in place in any convenient way.

The pipe D leads to any suitable air-compressing device, and it is used for conveying compressed air to the cask B, when its contents are racked off.

The operation of my improvement is as follows: The finishing-cask B is filled with the liquor to be treated, the same being charged with the requisite amount of freshly-fermented liquor, as described. While this is being done the bung o is securely closed, and the cock A, with its attachments, is secured to the cask, so as to open into it at the top, or as near the bung as practicable. Sufficient water is charged into the pipe C C', by preference, to fill it to or nearly to the level of the top of the cask, or the liquor therein. The plug a is turned, as shown in full lines at c, so as to open the way from the cask to the pipe C C', and the action or working of the contents of the cask is allowed to proceed. As gas is generated in such action it will pass from the cask through the cock A to the part C of the pipe, and as such gas accumulates its pressure will force the water in the pipe out of the part C into the leg or part C'. At this point the gas, being of less specific gravity than water, will escape upward through the water in the form of bubbles, and owing to the contractions in the passage through the pipe, as described, the water in the part C' will not be forced out, though the pressure of the gas as it passes from the cask is subjected to sudden changes. In this way a constant and uniform pressure will be exerted on the contents of the cask, which pressure will be measured by the weight of the column of water in the pipe C'. By making this column of sufficient height, as described, the weight or pressure therefrom will be sufficient to prevent the liquor in the cask from escaping with the gas, and thus all waste from such cause is avoided; and, also, the liquor being at all times, during such treatment, under pressure, it is prevented from becoming muddy or deteriorated, though it be left in the finishing-cask for some time after having come to the proper condition for racking off; and when it is desired to rack or draw off the finished beer, the passage in the cock A is opened to the pipe D and closed as to C, as described, when air may be forced into the cask, as desired.

I do not limit myself to the particular location or locations shown and described for the contractions in the pipe C C', as they may be placed at other parts of the pipe, and they may be made in other ways, and still perform the function described; and such modifications I consider as coming within my invention.

By the use of my improvement, the beer, having been once properly finished, may be racked or drawn off for use, as convenience may require, and it will not, as in the old process, be injured or deteriorated by being left in the finishing-cask.

I claim herein as my invention—

1. As an attachment to be applied to casks in the finishing operation, a three-way cock, in combination with compressed-air pipe D and U-shaped water-pipe C C', the latter having the reduced port or ports r at one or more points of its length, substantially as set forth.

2. The U-shaped water-pipe C C', having a reduced port or ports, r, at one or more points of its length, in combination with a cock for use with a finishing-cask, whereby a water-column in one leg of the pipe will exert a constant and uniform pressure on the surface of the beer, while excess of gas is permitted to escape, substantially as set forth.

In testimony whereof I have hereunto set my hand.

THEODORE F. STRAUB.

Witnesses:
 J. J. McCORMICK,
 CLAUDIUS L. PARKER.